United States Patent
Sopko, Jr. et al.

(10) Patent No.: US 7,076,954 B1
(45) Date of Patent: Jul. 18, 2006

(54) TURBOCHARGER SYSTEM

(75) Inventors: Thomas Michael Sopko, Jr., East Peoria, IL (US); Michael Edward Vanderham, East Peoria, IL (US); Kent Allen Casey, Washington, IL (US); Brian D. Kuras, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/094,276

(22) Filed: Mar. 31, 2005

(51) Int. Cl.
*F02B 33/44* (2006.01)
*F02B 37/04* (2006.01)
*F02B 37/10* (2006.01)
*F02B 37/12* (2006.01)
*F02B 41/10* (2006.01)
*F02G 1/00* (2006.01)
*F01N 5/04* (2006.01)

(52) U.S. Cl. .............................. 60/607; 60/608; 290/52
(58) Field of Classification Search .................. 60/607, 60/608; 290/52
See application file for complete search history.

(56) References Cited

U.S. PATENT DOCUMENTS

| | | | |
|---|---|---|---|
| 3,877,224 A | 4/1975 | Johnson | |
| 3,886,742 A | 6/1975 | Johnson | |
| 3,952,514 A | 4/1976 | Habiger | |
| 3,999,373 A | 12/1976 | Bell, III et al. | |
| 3,999,374 A | 12/1976 | Oppmann et al. | |
| 4,082,013 A | 4/1978 | Dornfeld et al. | |
| 4,182,125 A | 1/1980 | Spivey, Jr. | |
| 4,185,521 A | 1/1980 | Beals | |
| 4,203,395 A | 5/1980 | Cromas et al. | |
| 4,365,473 A | 12/1982 | Schexnayder et al. | |
| 4,680,933 A | 7/1987 | Bozung et al. | |
| 4,745,901 A | 5/1988 | Reifenberger et al. | |
| 4,774,811 A | 10/1988 | Kawamura | |
| 4,827,170 A | 5/1989 | Kawamura et al. | |
| 4,878,347 A | 11/1989 | Kawamura | |
| 4,882,905 A | 11/1989 | Kawamura | |
| 4,894,991 A | 1/1990 | Kawamura | |
| 4,901,530 A | 2/1990 | Kawamura | |
| 4,924,674 A | 5/1990 | Hara et al. | |
| 4,955,199 A | 9/1990 | Kawamura | |
| 4,958,497 A | 9/1990 | Kawamura | |
| 4,958,708 A | 9/1990 | Kawamura | |
| 4,981,017 A | 1/1991 | Hara et al. | |

(Continued)

FOREIGN PATENT DOCUMENTS

JP            63105222 A  *  5/1988

*Primary Examiner*—Sheldon J Richter
(74) *Attorney, Agent, or Firm*—Finnegan, Henderson, Farabow, Garrett LLP; Michael S. King (57) ABSTRACT

A system for controlling intake pressure of a combustion engine operably coupled to a power generation system includes a sensor configured to output a signal indicative of a pressure in an intake system of the combustion engine and a sensor configured to output a signal indicative of a load on the power generation system. The system further includes a turbocharger operably coupled to the intake system. The system also includes an electric machine operably coupled to the turbocharger. The electric machine is configured to supply torque to the turbocharger. The system further includes a turbocharger controller operably coupled to the electric machine. The turbocharger controller is configured to control operation of the electric machine such that the turbocharger supplies a desired intake pressure to the combustion engine based at least partially on the signal indicative of a pressure in the intake system and the signal indicative of a load on the power generation system.

18 Claims, 3 Drawing Sheets

U.S. PATENT DOCUMENTS

| | | |
|---|---|---|
| 5,005,539 A | 4/1991 | Kawamura |
| 5,022,353 A | 6/1991 | Kamamura |
| 5,038,566 A | 8/1991 | Hara |
| 5,074,115 A | 12/1991 | Kawamura |
| 5,079,913 A | 1/1992 | Kishishita |
| 5,088,286 A | 2/1992 | Muraji |
| 5,105,624 A | 4/1992 | Kawamura |
| 5,168,706 A | 12/1992 | Kawamura |
| 5,214,333 A | 5/1993 | Kawamura |
| 5,306,997 A | 4/1994 | Akiyama |
| 5,341,060 A | 8/1994 | Kawamura |
| 5,406,797 A | 4/1995 | Kawamura |
| 5,560,208 A | 10/1996 | Halimi et al. |
| 5,678,407 A * | 10/1997 | Hara ............................ 60/608 |
| 5,751,137 A * | 5/1998 | Kiuchi et al. .................. 322/14 |
| 5,842,144 A | 11/1998 | Coutant et al. |
| 5,868,214 A | 2/1999 | Workman |
| 5,881,559 A * | 3/1999 | Kawamura ................... 60/597 |
| RE36,609 E | 3/2000 | Halimi et al. |
| 6,079,211 A | 6/2000 | Woollenweber et al. |
| 6,085,527 A | 7/2000 | Woollenweber et al. |
| 6,145,314 A | 11/2000 | Woollenweber et al. |
| 6,164,402 A | 12/2000 | Hastreiter |
| 6,256,993 B1 | 7/2001 | Halimi et al. |
| 6,328,000 B1 | 12/2001 | Hawkins et al. |
| 6,335,573 B1 | 1/2002 | Eguchi et al. |
| 6,385,970 B1 | 5/2002 | Kuras et al. |
| 6,394,206 B1 | 5/2002 | Fury |
| 6,409,628 B1 | 6/2002 | Kuras |
| 6,415,606 B1 * | 7/2002 | Bowman et al. ............... 60/608 |
| 6,424,902 B1 | 7/2002 | Kuras |
| 6,449,950 B1 | 9/2002 | Allen et al. |
| 6,901,324 B1 | 5/2005 | Rose et al. |
| 6,931,850 B1 * | 8/2005 | Frank et al. ................... 60/608 |
| 2003/0188533 A1 * | 10/2003 | Jaster .......................... 60/608 |

* cited by examiner

TURBOCHARGER SYSTEM

TECHNICAL FIELD

The present disclosure relates generally to a turbocharger system and, more particularly, to an electric turbocharger system for use with a power generation system.

BACKGROUND

A power generation system may used to generate power for either a stationary or a vehicular application. For example, an electric power generation system may used to provide electric power for a building or to provide power for propelling a vehicle and/or operating systems of a vehicle that require electric energy. In particular, a power generation system may be used to provide electric energy for what is sometimes referred to as a "hybrid vehicle" or "hybrid-electric vehicle," which may include a combustion engine operably associated with an electric generator. The combustion engine generates mechanical energy and the electric generator converts at least a portion of the mechanical energy into electric energy. The electric energy may be used to operate one or more electric motors and/or other electrically-operated vehicle systems. For example, the one or more electric motors may be used to provide torque to driving members (e.g., wheels or ground engaging tracks) to propel the vehicle either independently or in combination with torque provided by the combustion engine. For a vehicle such as a work machine, for example, a wheel loader or a track-type tractor, the one or more electric motors may be used to propel the vehicle and the mechanical energy produced by the combustion engine and/or electric energy produced by the generator may be used to operate work implements via hydraulic actuators and/or hydraulic motors.

Regardless of whether the power generation system is used in a stationary or a vehicular application, it may often be desirable for the power generation system to be able to quickly and efficiently respond to sudden increases in load on the system. For example, in a power generation system used to provide electric energy for a building, if a sudden large increase in demand for electric energy occurs due, for example, to activation of one or more appliances requiring a substantial amount of electricity, a sudden large load will be placed on the power generation system. In vehicle applications, for example, in a work machine application, if the work machine is traveling across the ground and lifts a heavy load, such as a bucket filled with dirt and rock, a sudden large load will be placed on the power generation system due to the mechanical energy needed to lift the load. Such sudden large loads may cause the engine speed of the combustion engine to drop to an undesirably low speed (sometimes referred to as an "under-speed condition"), which may result in inefficient and/or undesirable operation of the combustion engine.

In order to counteract such large sudden loads on the electric power generation system, it may be desirable for the combustion engine to provide a responsive increase in torque to the power generation system. The rate at which the sudden electric and/or mechanical load may occur, however, may be essentially instantaneous relative to the ability of the combustion engine to respond to the sudden load. In particular, in order for the combustion engine to provide the desired responsive increase in torque, an increase in the amount of fuel and/or air supplied to the combustion engine must be increased. For example, more fuel may be delivered to the combustion engine to increase torque. In combination with the reduced engine speed that accompanies the sudden load, however, the resulting combustion may exhibit unacceptably high exhaust emission levels due to an overly rich air-to-fuel ratio (AFR). On the other hand, the intake pressure (e.g., the inlet manifold pressure) of the combustion engine may be increased in order to deliver more air to the combustion engine. If, however, the amount of fuel delivered to the engine is not also increased, an acceptable AFR will not likely be achieved, and there will not be a sufficient increase in torque to counteract the sudden load on the power generation system.

One technique for increasing the intake pressure of a combustion engine is the use of an exhaust gas-driven turbocharger. Such a turbocharger uses energy contained in the gases exhausted following combustion in a combustion engine to spin a turbine operably coupled to a compressor that, in turn, compresses air delivered to the intake system of the combustion engine. In this fashion, the intake pressure may be increased and more air may be delivered to the combustion engine, thereby increasing its output torque. Due to its exhaust gas-driven nature, however, a turbocharger may take an undesirably long time to respond to the need for increased output torque in response to a sudden change in load. In particular, since the turbocharger's compressor relies on the exhaust gas for driving its turbine, at low engine speeds that may occur as a result of a sudden load increase, the turbocharger's ability to provide a responsive increase in intake pressure may be undesirably slow.

One method of increasing the speed of response of a turbocharger is described in U.S. Pat. No. 4,901,530 (the '530 patent) issued to Kawamura on Feb. 20, 1990. The '530 patent describes a method for controlling a turbocharger with a rotary electric machine that detects the rotational speed of a motor vehicle's engine and an amount of accelerator pedal depression to monitor running conditions of the motor vehicle. A required boost pressure based on the running conditions is determined and if a difference between the required boost pressure and a present boost pressure is greater than a prescribed value, the device determines that the motor vehicle is running under conditions that require quick acceleration. The device then drives the rotary electric machine coupled to the rotatable shaft of the turbocharger to increase the speed of rotation of the turbocharger for a quick buildup of the boost pressure.

Although the device of the '530 patent may speed the build-up of boost pressure of the turbocharger, the determination that the motor vehicle is running under conditions that require quick acceleration are based on the detected rotational speed of a motor vehicle's engine and an amount of accelerator pedal depression. For power generation systems that experience sudden loads, however, detecting a motor's rotational speed and an accelerator pedal depression may not provide an effective determination basis and/or a quick enough response for increasing the rotation of the turbocharger's compressor in order to provide an increase in a combustion engine's torque output.

The disclosed electric turbocharger system is directed to overcoming one or more of the problems set forth above.

SUMMARY OF THE INVENTION

In one aspect, the present disclosure is directed to a system for controlling intake pressure of a combustion engine operably coupled to a power generation system. The system for controlling intake pressure includes a sensor configured to output a signal indicative of a pressure in an intake system of the combustion engine and a sensor configured to output a signal indicative of a load on the power generation system. The system for controlling intake pressure further includes a turbocharger operably coupled to the intake system. The turbocharger is configured to increase the intake pressure in the intake system of the combustion engine. The system for controlling intake pressure also includes an electric machine operably coupled to the turbocharger. The electric machine is configured to supply torque to the turbocharger. The system for controlling intake pressure further includes a turbocharger controller operably coupled to the electric machine. The turbocharger controller is configured to control operation of the electric machine such that the turbocharger supplies a desired intake pressure to the combustion engine based at least partially on the signal indicative of a pressure in the intake system and the signal indicative of a load on the power generation system.

In another aspect, the present disclosure is directed to a power generation system including a combustion engine configured to produce mechanical energy. The combustion engine includes an intake system. The system further includes a generator operably coupled to the combustion engine. The generator is configured to convert at least a portion of the mechanical energy into electric energy. The system further includes a turbocharger operably coupled to the intake system of the combustion engine. The turbocharger is configured to increase intake pressure in the intake system. The system also includes an electric machine operably coupled to the turbocharger. The electric machine is configured to supply torque to the turbocharger. The system further includes a turbocharger controller operably coupled to the turbocharger and the electric machine. The turbocharger controller is configured to selectively activate the electric machine to supply torque to the turbocharger based on a difference between an actual intake pressure and a desired intake pressure, the desired intake pressure being based at least partially on a load placed on the system.

In a further aspect, the present disclosure is directed to method of maintaining a desired air-to-fuel ratio supplied to a combustion engine operably coupled to a power generation system. The method includes sensing a load on the power generation system, outputting the sensed load on the power generation system to a turbocharger controller, and controlling operation of the turbocharger via the turbocharger controller. Controlling operation of the turbocharger via the turbocharger controller is based at least partially on the sensed load on the power generation system such that the desired air-to-fuel ratio supplied to the combustion engine is substantially maintained.

DETAILED DESCRIPTION

Figure 1:
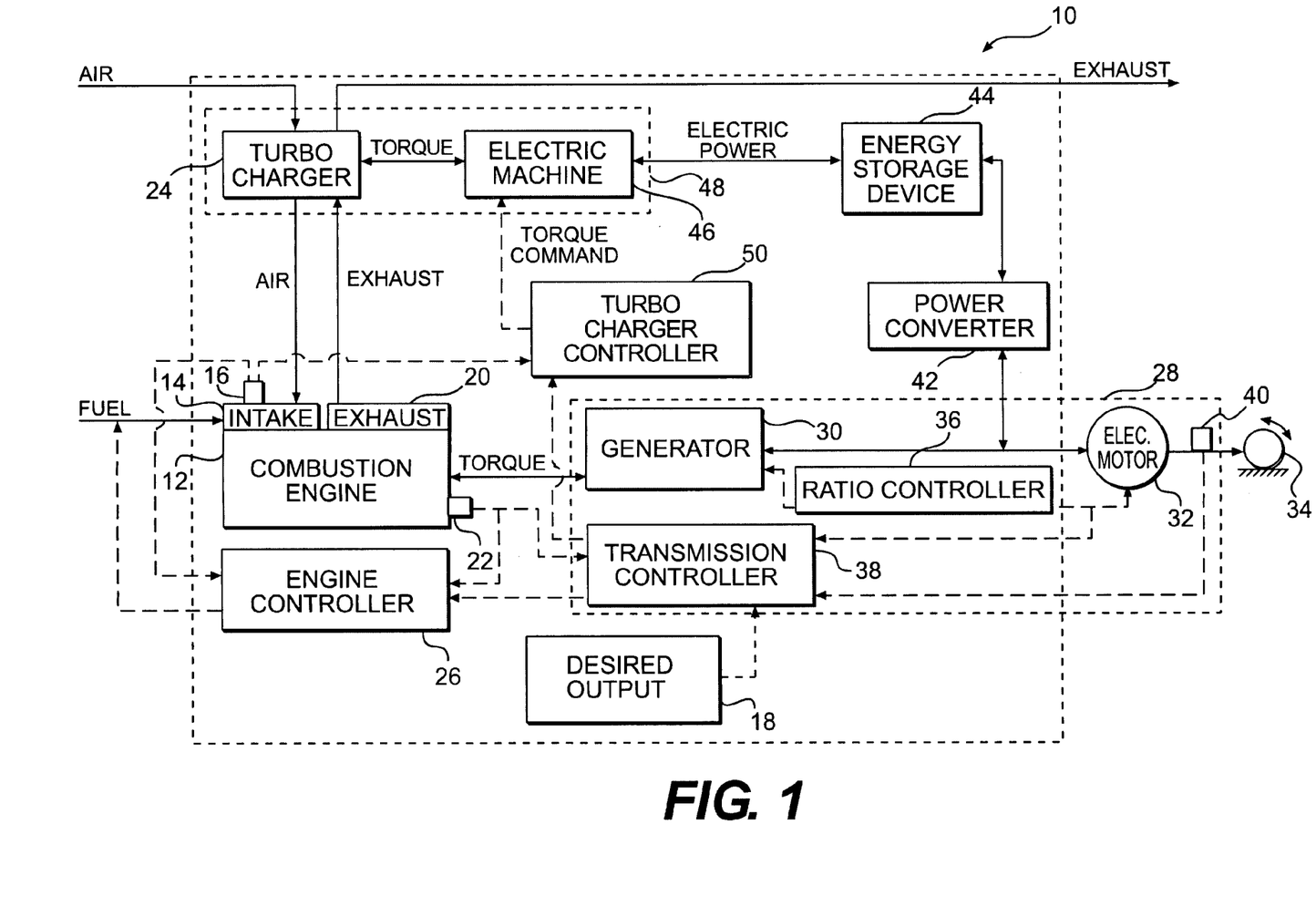
FIG. 1 is schematic block diagram of a power generation system according to a disclosed exemplary embodiment.

FIG. 1 schematically illustrates an exemplary power generation system 10, for example, an electric power generation system. Power generation system 10 may include one or more combustion engines 12 configured to generate mechanical energy. For example, combustion engine 12 may be an internal combustion engine configured to accept air and fuel via an intake system 14 including an intake manifold and to convert a mixture of the air and fuel into mechanical energy via combustion. Intake system 14 may include a pressure sensor 16 configured to emit a pressure signal representing the magnitude of pressure in the intake manifold. The mixture of air and fuel may be controlled such that its air-to-fuel ratio (AFR) is optimum for desired operation to, for example, improve fuel efficiency and/or reduce exhaust emissions. Further, the amount of air and/or fuel delivered to combustion engine 12 may be at least partially controlled via a signal indicative of a desired output 18, which may be provided, for example, via a throttle command, machine speed, electrical output, torque, and/or rimpull command. Once the air and fuel has undergone combustion, it is expelled from combustion engine 12 in the form of exhaust gas via an exhaust system 20. Examples of combustion engines include spark ignition engines, compression ignition engines, rotary engines, natural gas engines, and/or any derivatives thereof. Other combustion engines known to those having skill in the art are also contemplated.

Combustion engine 12 may include an engine sensor 22 configured to sense combustion engine speed and/or to produce an engine speed signal. Engine sensor 22 may include, for example, a magnetic pick-up sensor configured to produce a signal corresponding to the rotational speed of combustion engine 12. Engine sensor 22 may also be capable of determining speed, angular position, and/or direction of rotation of combustion engine 12's output shaft.

Combustion engine 12 may be operably coupled to a turbocharger 24 configured to compress air prior to delivery to intake system 14 of combustion engine 12 for combustion. Turbocharger 24 may include a turbine operably coupled to exhaust system 20 such that energy in the exhaust gas may be converted into mechanical energy via rotation of the turbine. Turbocharger 24 may also include a compressor operably coupled to the turbine (e.g., via a shaft) and intake system 14 such that mechanical energy of the turbine may be imparted to the compressor, thereby rotating the compressor such that pressure in intake system 14 is increased. In this manner, more air and/or fuel may be delivered to combustion engine 12 such that combustion engine 12 may create more torque and/or power. Furthermore, power generation system 10 may include an engine controller 26 configured to regulate the amount of fuel and/or air delivered to combustion engine 12 such that a desired AFR may be maintained for combustion in order to achieve, for example, an optimum fuel efficiency and/or a minimum level of exhaust emissions.

Combustion engine 12 may be operably coupled to one or more transmissions via an output shaft. For example, in the exemplary embodiment depicted in FIG. 1, combustion engine 12 is operably coupled to electric transmission 28. Electric transmission 28 may be, for example, a continuously variable transmission (CVT) and may include a generator 30 configured to convert at least a portion of mechanical energy in the form of torque supplied by combustion engine 12 into electric energy. Electric transmission 28 may further include one or more electric motors 32 configured to provide torque to one or more driving members 34 (e.g., wheels or ground engaging tracks). Electric transmission 28 may include a ratio controller 36 and a transmission controller 38. Ratio controller 36 may be operably coupled to generator 30 and electric motor 32 and may be configured to control the ratio of a transmission output speed to a transmission input speed, which may be determined for example, via the output of engine sensor 22 and one or more transmission sensors 40. Transmission sensor 40 may be configured to generate a load signal indicating, for example, the load (e.g., a torque load) on electric transmission 28. Alternatively, the load on electric transmission 28 may be determined without transmission sensor 40, for example, by sensing electric load and/or by other methods known to a person having skill in the art. Transmission controller 38 may be operably coupled to ratio controller 36 and may be configured to receive signals from ratio controller 36 and communicate with engine controller 26, for example, as part of a predictive load management system. According to some embodiments, rather than being separate from transmission controller 38, ratio controller 36 may be integral with transmission controller 38. By virtue of combustion engine 12 being operably coupled solely to one or more generators 30, a vehicle using such a power generating system configuration may be propelled via torque supplied solely from one or more electric transmissions 28. Such a configuration is sometimes referred to as a "series hybrid" system.

Generator 30 may also be configured to supply electric energy to a power converter 42. Power converter 42 may be configured to convert electric energy into a form for use by electrically-powered components of power generating system 10 and/or any other devices operably coupled thereto that may be electrically-powered.

Power generating system 10 may also include an energy storage device 44, for example, one or more batteries, operably coupled to power converter 42. Energy storage device 44 may be configured to store energy in the form of electric energy for use by components of power generating system 10 and/or any other devices operably coupled thereto.

Power generating system 10 may include an electric machine 46 operably associated with energy storage device 44 and turbocharger 24. Electric machine 46 may include an electric motor configured to provide torque to turbocharger 24 in order to drive turbocharger 24's compressor and/or to supplement torque provided to turbocharger 24's compressor by turbocharger 24's turbine. Electric machine 46 may further include a generator configured to convert mechanical energy received from turbocharger 24's turbine into electric energy, which may, in turn, be stored in energy storage device 44. In combination, turbocharger 24 and electric machine 46 may serve to form a turbocharger system 48, which may be at least a portion of a turbocharger compounding system.

Power generating system 10 may further include a turbocharger controller 50, which may be configured to receive inputs in the form of an intake pressure signal from the intake sensor 16, and/or a load signal received from engine controller 26 and/or transmission controller 38. Turbocharger controller 50 may be operably coupled to electric machine 46 of turbocharger 48 and may be configured to control turbocharger 24. For example, turbocharger controller 50 may be configured to activate electric machine 46 to supply torque to turbocharger 24's compressor, activate electric machine 46's generator to slow turbocharger 24's compressor, and/or may open a wastegate to reduce the amount of exhaust gas driving turbocharger 24's turbine.

Figure 2:
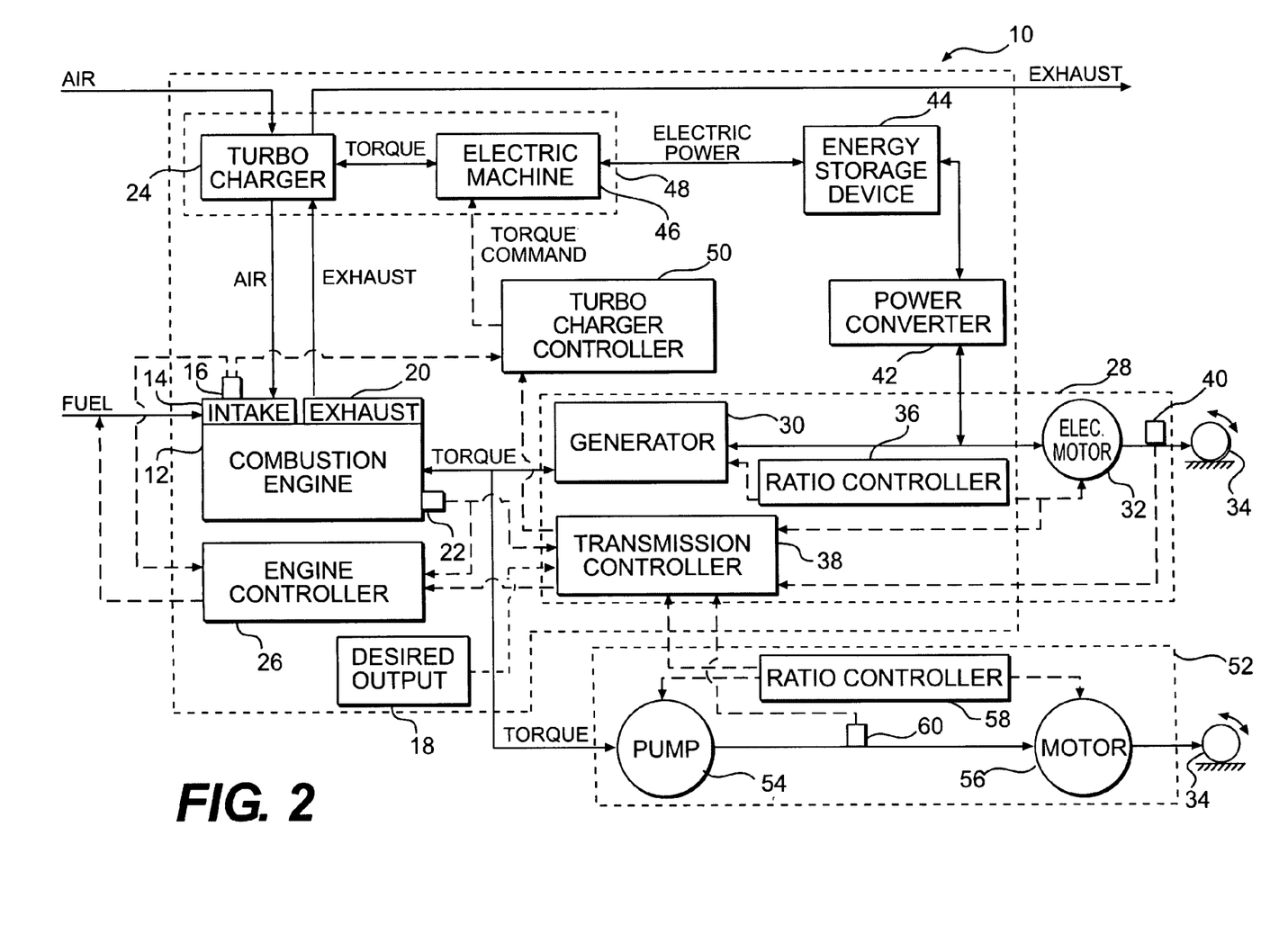
FIG. 2 is a schematic block diagram of a power generation system according to a disclosed exemplary embodiment.

Referring to the exemplary embodiment schematically depicted in FIG. 2, combustion engine 12 may be operably coupled to both an electric transmission 28 and a second transmission, for example, a mechanical transmission 52 configured to provide torque to driving members 34 (e.g., wheels or ground engaging tracks) to propel a vehicle with energy provided by combustion engine 12. Mechanical transmission 52 may be a fixed or multi-ratio transmission or, for example, a mechanical CVT, such as a hydraulic CVT, including one or more pumps 54 and one or more motors 56, such as, for example, a variable displacement pump and a variable displacement motor driven by fluid received from pump 54. Mechanical transmission 52 may include a ratio controller 58 configured to alter displacement of pump 54 and/or motor 56 (i.e., when pump 54 is a variable displacement pump and/or when motor 56 is a variable displacement motor) to thereby control the output of mechanical transmission 52's motor 56, which may be operably coupled to driving members 34. Mechanical transmission 52 may also include one or more transmission sensors 60 configured to provide a load signal (e.g., a torque load signal). For example, transmission sensor 60 may include a resolver configured to measure, for example, a pressure differential between supply fluid fed to pump 54 and return fluid exiting motor 56. The pressure differential may be indicative of mechanical transmission 52's load.

In addition to being operably coupled to mechanical transmission 52, combustion engine 12 of the exemplary embodiment depicted in FIG. 2 may be operably coupled to electric transmission 28 in a manner at least similar to the embodiment depicted in FIG. 1. Generator 30 may be operably coupled to, for example, one of more electric motors 32, which may provide torque to driving members 34 of a vehicle. By virtue of combustion engine 12 being operably coupled to both electric transmission 28 and mechanical transmission 52, a vehicle using such a power generating system configuration may be propelled via torque supplied from electric transmission 28 and/or mechanical transmission 52. Such a configuration is sometimes referred to as a "parallel hybrid" system.

Figure 3:
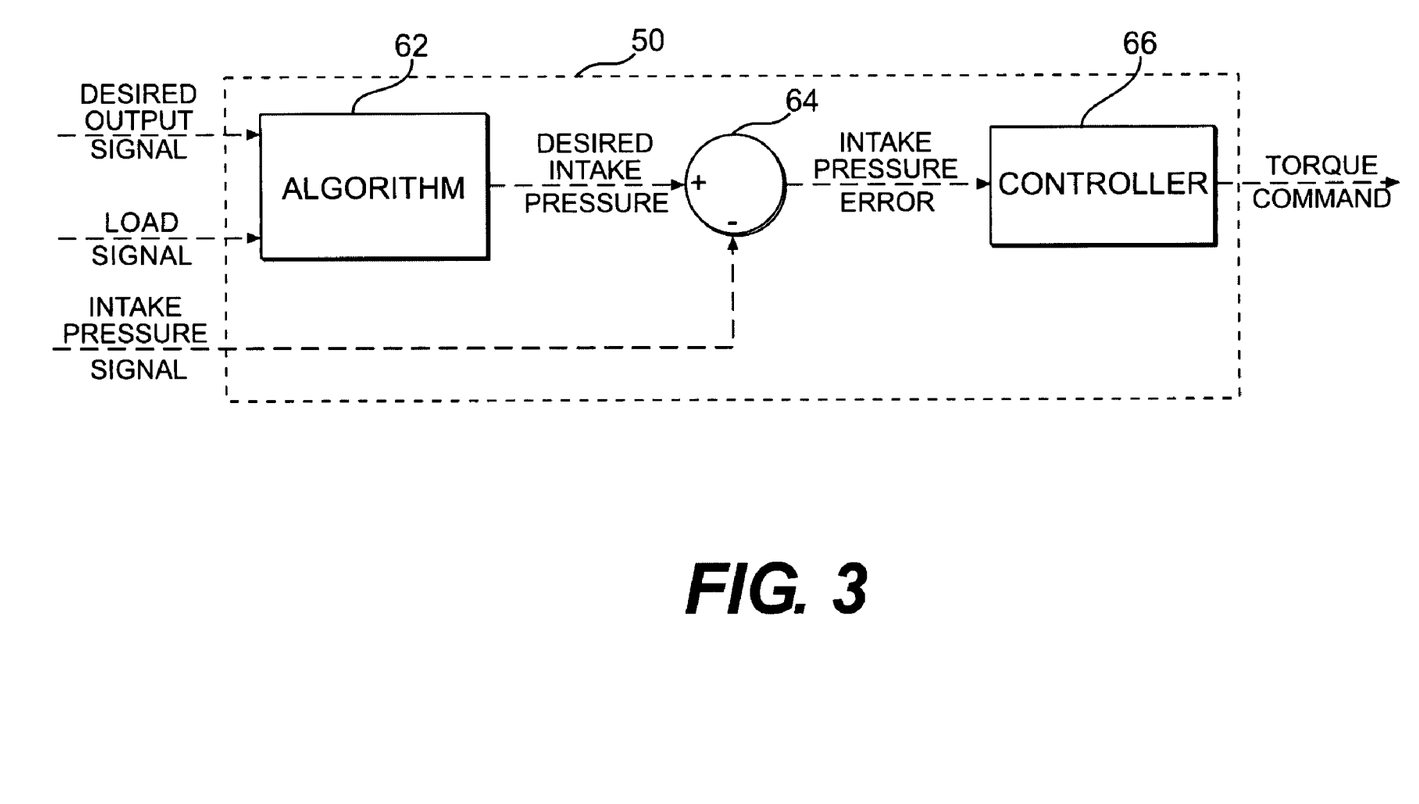
FIG. 3 is a schematic block diagram of a control strategy for a turbocharger system according to a disclosed exemplary embodiment.

Referring FIG. 3, turbocharger controller 50 may include an algorithm 62 (e.g., a flexible gain scheduling algorithm) configured to receive inputs, such as a load signal (e.g., a transmission load signal). Algorithm 62 may be configured to determine a desired intake pressure based on a function of, for example, desired output signal 18 and the load signal. For example, an engine power load may be determined by algorithm 62 based a magnitude of the transmission load signal and/or a rate of change of the magnitude of the transmission load signal. Further, a desired AFR (e.g., an optimum AFR) may be selected by algorithm 62 based on the magnitude of the transmission load signal and/or a rate of change of the magnitude of the transmission load signal via, for example, one or more maps and/or equations loaded into a memory device of turbocharger controller 50. Further, the desired AFR may be used to determine a desired intake pressure in an at least similar manner.

Turbocharger controller 50 may include a comparator 64 configured to compare the desired intake pressure received from algorithm 62 and the intake pressure signal received from pressure sensor 16. Comparator 64 may generate an intake pressure error signal, and turbocharger controller 50 may further include a controller 66 (e.g., a proportional-integral-differential (PID) controller) configured to receive the intake pressure error signal and send an appropriate torque command signal to electric machine 46. Alternatively (or in addition), other control strategies such as proportional-integral control may be employed in controller 66.

Based on the torque command signal from turbocharger controller 50, if additional intake pressure is needed to achieve a desired intake pressure associated with a desired AFR to achieve a desired torque increase of combustion engine 12, electric machine 46 may provide torque (e.g., supplemental torque) to the compressor of turbocharger 24, thereby increasing the intake pressure to achieve the desired AFR. Alternatively, if a reduction in intake pressure is needed to achieve a desired intake pressure associated with a desired AFR to achieve a desired torque decrease of combustion engine 12, electric machine 46 may provide torque (e.g., a braking torque) to the compressor of turbocharger 24, thereby decreasing the intake pressure to achieve the desired AFR.

INDUSTRIAL APPLICABILITY

Power generation system 10 may be used for stationary applications such as, for example, providing electric energy for a building or for providing energy for propelling a vehicle and/or operating systems of a vehicle that require electric energy. For example, power generation system 10 may be used to provide electric energy for a building to power an electric power grid. Power generation system 10 may also be used to provide electric energy and/or mechanical energy for a hybrid vehicle, which may include one or more combustion engines operably associated with one or more transmissions. For example, combustion engine 12 may operate to produce mechanical energy and generator 30 may operate to convert at least a portion of the mechanical energy into electric energy. The electric energy may be used to operate one or more electric motors and/or other electrically-operated vehicles systems. For example, one or more electric motors 32 may be used to provide torque to driving members 34 (e.g., wheels or ground engaging tracks) to propel the vehicle either independently or in combination with torque provided by combustion engine 12 via one or more mechanical transmissions 52 (see, for example, FIG. 2). For a vehicle such as a work machine, for example, a wheel loader or a track-type tractor, one or more electric motors 32, either alone or in combination with one or more mechanical transmissions 52, may be used to propel the vehicle, and electric energy converted by generator 30 and/or the mechanical energy produced by combustion engine 12 may be used to operate work implements via hydraulic actuators and/or hydraulic motors.

Referring to FIG. 1, for example, electric transmission 28 may be an electric CVT, which may include generator 30 operably coupled one or more electric motors 32. Generator 30 may provide electric energy to power electric motor 32. Generator 30 and electric motor 32 may be in communication via ratio controller 36, which may be configured to control the ratio of transmission output speed to transmission input speed. For example, ratio controller 36 may be configured to adjust the ratio of transmission output speed to transmission input speed, as limited by the actual power output of combustion engine 12. When both output torque and output speed increases are demanded of electric transmission 28 (i.e., in a vehicle application) a demand for increased power may be communicated to combustion engine 12. On the other hand, when both output torque and output speed decreases are desired for electric transmission 28, a demand for decreased power may be communicated to combustion engine 12.

For an exemplary embodiment including a work machine, as the work machine encounters a change in loading conditions due, for example, to changing from a high ground speed combined with a low load situation to a suddenly high load situation, ratio controller 36 may be configured to shift the ratio of electric transmission 28 from a high-speed output to a low-speed output. For an electric transmission, such as, for example, electric transmission 28 shown in FIGS. 1 and 2, the ratio of transmission output speed to transmission input speed at a particular combustion engine output power may be controlled, for example, by manipulating a torque command signal to electric motor 32. As the work machine encounters a change in load conditions due, for example, to changing from a high ground speed with a low load condition to a suddenly high load situation, ratio controller 36 may alter the torque command signal to electric motor 32 to produce additional torque. In turn, the electric motor 32 demands additional electric power from the generator 30 in the form of, for example, additional current.

One or more transmission sensors 40 associated with electric transmission 28 may be configured to provide information relating to its operation. For example, such information may include a torque command signal and/or speed signal from transmission sensor 40 and/or a speed signal from combustion engine sensor 22, which may be used together with the torque command signal to determine a change in torque load of electric transmission 28. The torque command signal from ratio controller 36 to electric motor 32 may be used to measure and/or estimate the output torque of electric motor 32. Other methods of measuring transmission load may be implemented such as, for example, measuring motor input voltage and current, measuring generator output voltage and current, and other methods known to those having ordinary skill in the art.

Referring to FIG. 2, when shifting mechanical transmission 52 from a high-speed output to a low-speed output, for example, ratio controller 58 may be configured to decrease fluid flow supplied to motor 56 by decreasing displacement of pump 54, such that the load on combustion engine 12 is reduced. Ratio controller 58 may also increase displacement of motor 56 in order to decrease the load on combustion engine 12. In this fashion, the ratio of transmission output speed to input speed of a hydraulic transmission (e.g., as shown in FIG. 2) at a particular combustion engine power may be controlled by manipulating the displacement of pump 54 and/or motor 56. As the ratio of mechanical transmission 52 shifts to limit and/or reduce the load on combustion engine 12, the maximum potential ground speed may be reduced. This may result in a drop in work machine ground speed. On the other hand, if the work machine encounters a reduction in load, ratio controller 58 may increase the displacement of pump 54 and/or may decrease the displacement of the motor 56, allowing for an increase in work machine ground speed and a reduction in the torque available to correspond to the reduced load demand on the work machine.

For a mechanical transmission, such as mechanical transmission 52 depicted in FIG. 2, transmission sensor 60 may provide a fluid pressure signal indicative of the load on mechanical transmission 52. For example, transmission controller 38 may be configured to receive inputs from mechanical transmission 52, including a displacement signal from ratio controller 58 and/or a fluid pressure signal from transmission sensor 60. Transmission controller 38 may use the displacement signal and/or fluid pressure signal to calculate a transmission load and/or to determine a change in transmission load.

Engine controller 26 and/or transmission controller 38 may be used, for example, as part of a predictive load management system. Engine controller 26 and/or transmission controller 38 may be embodied in one or more a microprocessors. Numerous commercially-available microprocessors may be adapted to perform the functions of engine controller 26 and/or transmission controller 38.

Transmission controller 38 may be configured to transmit a torque command signal to the engine controller 26. Engine controller 26 may be configured to receive input from transmission controller 38 that is indicative of transmission load and/or power load (e.g., output torque and/or power demand). Engine controller 26 may also be configured to receive operating parameters such as, for example, the combustion engine 12's speed from engine sensor 22 and/or the intake pressure signal from pressure sensor 16. Engine controller 26 may also be configured to receive reference parameters, including fuel settings and air delivery requirements. Engine controller 26 may be further configured to process these operating and reference parameters and determine commands to modify performance characteristics of combustion engine 12 during a predictive time period, for example, when a change in load demand is transferred from one or more of the transmissions to combustion engine 12.

The term "predictive time period," as used herein, is the period of time from when one of the transmissions first experiences a load change on at least one of the driving members 34 until combustion engine 12 experiences the load change. For example, one of the transmissions may experience a change in load on its respective driving member 34. The driving member 34 may transfer the load change to combustion engine 12 via, for example, transmission controller 38 and/or engine controller 26. Combustion engine 12's performance may be modified to accommodate the change in load. The time period associated with such a load transfer is the predictive time period.

Engine controller 26 may be configured to modify performance of combustion engine 12, for example, when engine controller 26 receives information indicating that the load on one or more of the transmissions has changed. For example, engine controller 26 may produce signals to increase or decrease power output of combustion engine 12. In particular, engine controller 26 may adjust the amount of fuel and/or air delivered to intake system 14 or any other aspect of combustion engine 12's operation that may result in a change in the power output.

For example, engine controller 26 may be configured to modify operation of a fuel injection system to vary the power output of combustion engine 12. In particular, engine controller 26 may send a fuel delivery altering signal to adjust the performance of a fuel injection system to control a fuel delivery rate, a fuel delivery timing, a fuel delivery pressure, and/or a fuel torque limit. These fuel delivery altering signals may be produced in accordance with combustion engine control maps such as, for example, fuel rail pressure maps, fuel timing maps, fuel torque limit maps, or other maps known to those having ordinary skill in the art. Alternatively (or in addition), combustion engine 12's performance may be varied to achieve a desired performance using a proportional-integral-differential (PID) control loop. For example, fuel delivery altering signals may be delivered to solenoid-operated fuel injector units associated with individual combustion chambers of combustion engine 12. Duration of the fuel delivery altering signals may correspond to the timing of the solenoid, thereby controlling the duration for which the fuel injector unit delivers fuel to an associated combustion chamber during a combustion cycle. The fuel injector units may be electrically-actuated units, hydraulically-actuated units, mechanically-actuated units, or any other units known to those having ordinary skill in the art.

Engine controller 26 may control the fuel delivery to combustion engine 12 based on a differential between a desired power output required to meet an anticipated load demand change and the current power output. In an exemplary predictive load management system, the fuel delivery to combustion engine 12 may be changed during the predictive time period before the load is transferred from one of the transmissions to combustion engine 12 such that combustion engine 12's power output approaches or achieves the desired power output in preparation for responding to the anticipated change in load demand. As a result, engine controller 26 may change the fuel delivery based on the perceived power output required to either reduce combustion engine 12's under-speed or over-speed condition that may be associated with the anticipated change in load.

Changes in the fuel delivery to combustion engine 12 may be based on a differential between the actual intake pressure and a desired intake pressure required to minimize response time associated with the anticipated load demand change. In an exemplary predictive load management system, fuel delivery to combustion engine 12 may be changed during the predictive time period before the load is transferred from one or more of the transmissions to combustion engine 12 such that the intake pressure approaches or achieves the desired intake pressure in preparation for responding to the anticipated change in load demand. As a result, engine controller 26 may change the fuel delivery based on the perceived intake pressure required to reduce response time associated with the anticipated change in load demand.

In addition, engine controller 26 may produce signals altering air delivery characteristics directly. Air delivery altering signals, which may cause a change in the intake pressure, may be produced in accordance with combustion engine control maps such as, for example, boost maps, wastegate controlling maps, turbo compounding maps, turbo braking maps, and/or other maps known to those having ordinary skill in the art.

Engine controller 26 may be configured to deliver air delivery command signals so that the intake pressure may be changed. The intake pressure may be changed by, for example, a turbo compounding system, a turbo braking system, an exhaust gas wastegating system, and/or other systems known to those having ordinary skill in the art. For example, in some exemplary predictive load management systems, air delivery to combustion engine 12 may be changed during the predictive time period before the load is transferred from one or more of the transmissions to combustion engine 12 such that the intake pressure approaches or achieves the desired air delivery level in preparation for responding to the predicted change in load demand. As a result, engine controller 26 may change the intake pressure based on the perceived pressure differential required to minimize response time associated with the anticipated change in load.

Turbocharger system 48 may be at least a portion of a turbocharger compounding system. The turbocharger compounding system may be used, for example, to increase intake pressure when the flow of exhaust from combustion engine 12 is relatively low. For example, when a load demand is placed on combustion engine 12 to respond to an increased load on power generation system 10, additional fuel may be delivered to combustion engine 12. In order to maintain an AFR consistent with efficient combustion and/or low exhaust emissions, it may be desirable to increase the supply of air to intake system 14. Turbocharger system 48's electric machine 46 may provide supplemental torque to turbocharger 24's compressor, thereby reducing any inherent lag in turbocharger 24's responsiveness to provide an increased supply of air to intake system 14. For example, electric energy may be supplied to electric machine 46 via energy storage device 44 and/or via an integrated starter generator. As a result, turbocharger 24 may supply sufficient air to intake system 14 to correspond to the increase in fuel supplied to intake system 14 in order to substantially maintain an AFR consistent with efficient and/or low exhaust emission operation in a more responsive manner. This may result in increased responsiveness to an increase in load demand on power generation system 10.

Turbocharger system 48 may include a turbo braking system configured to apply a resistance and/or load to turbocharger 24's compressor rotation. For example, when power generation system 10 is exposed to a demand for less power, turbocharger 24's inherent inertia may prevent it from reducing its compressor's rotational speed in a sufficiently responsive manner such that turbocharger 24 provides excessive intake pressure for the reduced power demand. Electric turbocharger 24's electric machine 46 may include a generator that may effectively act as a turbo braking system by activating such that mechanical energy associated with turbocharger 24's rotation may be converted into electric energy by electric machine 46's generator. In particular, torque used to drive electric machine 46's generator may act to reduce the rotational speed of turbocharger 24's compressor, and the converted electric energy may be stored in energy storage device 44. By virtue of increasing the responsiveness of the compressor's decrease in rotational speed, pressure in intake system 14 may be more quickly reduced, which may result in more efficient operation of combustion engine 12 and/or reduced exhaust emissions from combustion engine 12 due, for example, to an improved ability to maintain a desired AFR.

Turbocharger system 48 may include a turbocharger wastegating system configured to exhaust combustion gases to the atmosphere before reaching turbocharger 24's turbine. This may act to more quickly reduce the turbocharger 24's rotation, which may serve to improve the response time of combustion engine 12 to reductions in load by more quickly reducing pressure in intake system 14, which, in turn, may result in more efficient operation and/or reduced exhaust emissions from combustion engine 12.

During operation of exemplary predictive load management system, activation may begin once a load has been placed on one of the transmissions. For example, when transmission controller 38 determines that electric transmission 28 and/or mechanical transmission 52 experiences a load (e.g., a torque load), transmission controller 38 determines a difference in magnitude between a sensed load and a previous torque output of electric transmission 28 and/or mechanical transmission 52. Once a difference has been determined, the sensed load may become the previous torque output for a subsequent operational cycle of the predictive load management system. Transmission controller 38 may compare the magnitude of the determined difference to a predetermined value. If the magnitude of the determined difference is less than the predetermined value, no changes to the performance of combustion engine 12 may be made, and transmission controller 38 may continue to receive signals of the sensed load on electric transmission 28 and/or mechanical transmission 52. Acceptable values for the predetermined value of the magnitude of the difference of demand load changes that result in acceptable speed changes may be determined by lab and/or field-testing.

If, however, the magnitude of the determined difference is equal to or greater than the predetermined value, transmission controller 38 may provide an indication of load change to engine controller 26, which may determine a change in a performance characteristic of combustion engine 12 required to meet an anticipated load change. For example, engine controller 26 may modify fuel delivery and/or intake pressure to offset the anticipated load change in order to substantially minimize occurrences of an under-speed and/or over-speed condition of combustion engine 12 due to sudden changes in load.

For example, engine controller 26 may modify a fuel injection system output to increase or decrease power output of combustion engine 12. Engine controller 26 may, for example, determine a modified fuel torque limit, a modified fuel timing, and/or a modified fuel injection system rail pressure based on the load condition of electric transmission 28 and/or mechanical transmission 52, a desired speed of combustion engine 12, and/or an intake pressure. For example, engine controller 26 may then output a signal indicating an amount of fuel to be delivered to combustion engine 12 in response to a difference between the current speed of combustion engine 12 and intake pressure, and a desired speed of combustion engine 12 and a desired intake pressure.

Engine controller 26 may also be configured to alter air delivery, for example, to change the power output of combustion engine 12. Engine controller 26 may determine a desired intake pressure value based on a load condition of electric transmission 28 and/or mechanical transmission 52 and an anticipated affect of the transmission load on combustion engine 12's performance. For an increase in load, engine controller 26 may determine an increase in intake pressure desired for supplying enough air for efficient combustion of an increasing fuel supply that may accompany the anticipated increase in load. Engine controller 26 may then cause additional energy to be directed to turbocharger 24, for example, by providing a desired output signal 18 to transmission controller 38, which may in turn activate and/or increase output of electric machine 46's electric motor to supplement turbocharger 24's turbine, thereby increasing the intake pressure and associated air delivery to combustion engine 12. This may provide additional air to intake system 14 in order to substantially maintain a desired AFR, such that additional fuel supplied to intake system 14 has sufficient air to combust efficiently and/or with reduced exhaust emissions.

For a decrease in load on one or more of the transmissions, engine controller 26 may determine an amount of decrease in intake pressure and an associated air delivery that will allow for efficient combustion of a decreasing fuel supply that may accompany the anticipated decrease in load. Engine controller 26 may then cause energy to be directed to turbocharger system 48 such that turbocharger 24's rotation is slowed, thereby reducing associated air delivery to intake system 14. This may be accomplished via at least one of turbo braking, wastegating, and activation of electric machine 46's generator. For example, engine controller 26 may send desired output signal 18 to transmission controller 38, which may, in turn, be sent to engine controller 26 to activate electric machine 46's generator to reduce the speed of turbocharger 24's turbine, thereby decreasing the intake pressure and associated air delivery to combustion engine 12. Electric energy converted by electric machine 46's generator may be stored by energy storage device 44. This may result in a reduced amount air being provided to intake system 14 to correspond to a reduced amount of fuel supplied to intake system 14, such that combustion engine 12 operates efficiently and/or with reduced exhaust emissions.

As combustion engine 12's performance changes in response to engine controller 26 and/or load demands, the predictive load management system may continue cycling as electric transmission 28 and/or mechanical transmission 52 experience changes in load. Based on information provided by the transmission sensors 40 and/or 60, for example, the exemplary predictive load management system may operate to reduce response time associated with a change in load on electric transmission 28 and/or mechanical transmission 52, for example, to minimize combustion engine 12's under-speed or over-speed condition. In particular, transmission sensors 40 and/or 60 may be configured to detect a change in load that, under normal circumstances, might result in combustion engine 12 operating outside of a desired operating range, which may result in combustion inefficiencies, higher than desired exhaust emissions, and/or unstable operation. For example, the predictive load management system may serve to modify combustion engine 12's speed just prior to an anticipated load change experienced by the one or more transmissions, and may act to minimize an under-speed or over-speed condition that combustion engine 12 might otherwise exhibit. In addition (or alternatively), turbocharger system 48 may act to change intake system 14's characteristics just prior to an anticipated load, which may allow combustion engine 12 to respond more quickly to the changing load.

During operation, electric transmission 28 and/or mechanical transmission 52 may experience a sudden change in load, such as a demand for more or less torque. Because the transmission(s) experience load changes prior to combustion engine 12, transmission controller 38 may have sufficient time to alert engine controller 26 of the approaching change in load demand, thereby allowing engine controller 26 to respond to the change in transmission load demand prior to combustion engine 12's exposure to the change in load.

For example, electric transmission 28 may sense via transmission sensor 40 an increased motor command torque and may compare that sensed motor command torque to a reference torque value such that a change in load on electric transmission 28 may be indicated. For mechanical transmission 52 (e.g., a hydraulic continuously variable transmission), transmission controller 38 may detect an increase in load by sensing an increase in fluid pressure, for example, via sensor 60, within mechanical transmission 52 and may compare the sensed pressure along with a motor displacement with reference pressure and motor displacement values.

Transmission controller 38 may determine, for example, the magnitude of the increase in load and communicate an anticipated load to engine controller 26. Engine controller 26 may thereafter determine a preparatory action and communicate the preparatory action to combustion engine 12. Such preparatory action for an increased load may include increasing the fuel delivery rate, advancing the fuel delivery timing, increasing the fuel injection pressure, increasing the maximum fuel torque setting, and/or increasing intake system air pressure via turbocharger system 48, all of which may result in an increase in the output of combustion engine 12. Such an increase in the output of combustion engine 12 may function to offset and/or to minimize a predicted under-speed condition. An increase in intake pressure may effectively increase air delivery, which may provide combustion engine 12 with sufficient air for efficient combustion and may permit combustion engine 12 to respond more quickly to an anticipated demand for increased output power. An increase in air delivery may also serve to maintain a desired AFR such that combustion engine 12 operates more efficiently and/or with reduced exhaust emissions.

An anticipated decrease in load on one or more of the transmissions, for example, as sensed by transmission sensor 40 and/or transmission sensor 60, may be communicated to transmission controller 38. Transmission controller 38 may determine a load decrease and may communicate the load decrease to engine controller 26, which may thereafter determine and communicate preparatory commands to combustion engine 12. These preparatory commands may include decreasing the fuel delivery rate, retarding fuel delivery timing, decreasing fuel injection pressure, decreasing the maximum fuel torque setting, and/or decreasing intake air pressure. One or more of these preparatory commands may serve to decrease power output of combustion engine 12. A decrease in power output may function to offset and/or minimize a predicted over-speed condition of combustion engine 12. For example, a decrease in intake air pressure may result in a decrease in an associated air delivery, thereby providing combustion engine 12 with the ability to respond more quickly to a demand for decreased airflow. Intake air pressure and/or an associated air delivery may be reduced via turbocharger braking (e.g., via a generator of electric machine 46) and/or wastegating.

Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A vehicle comprising:
    a power generation system including:
    a combustion engine configured to produce mechanical energy, the combustion engine including an intake system;
    a generator operably coupled to the combustion engine, the generator being configured to convert at least a portion of the mechanical energy into electric energy;
    an electric motor operably coupled to the generator, the electric motor being configured to supply torque to at least one driving member;
    a turbocharger operably coupled to the intake system of the combustion engine, the turbocharger being configured to increase intake pressure in the intake system; and
    an electric machine operably coupled to the turbocharger, the electric machine being configured to supply torque to the turbocharger; and
    a turbocharger controller operably coupled to the turbocharger and the electric machine, the turbocharger controller being configured to selectively activate the electric machine to supply torque to the turbocharger based on a difference between an actual intake pressure and a desired intake pressure, the desired intake pressure being based at least partially on a load placed on the electric motor; and
    at least one driving member operably coupled to the electric motor.

2. A system for controlling intake pressure of a combustion engine operably coupled to a power generation system, the system comprising:
    a sensor configured to output a signal indicative of a pressure in an intake system of the combustion engine;
    a sensor configured to output a signal indicative of a load on the power generation system;
    a turbocharger operably coupled to the intake system, the turbocharger being configured to increase the intake pressure in the intake system of the combustion engine;
    an electric machine operably coupled to the turbocharger, the electric machine being configured to supply torque to the turbocharger; and a turbocharger controller operably coupled to the electric machine, wherein the turbocharger controller is configured to control operation of the electric machine such that the turbocharger supplies a desired intake pressure to the combustion engine based at least partially on the signal indicative of a pressure in the intake system and the signal indicative of a load on the power generation system.

3. The system of claim 2, wherein the turbocharger controller is configured to receive a signal indicative of a desired output and to control operation of the electric machine such that the turbocharger supplies a desired intake pressure to the combustion engine based partially on the signal indicative of a desired output.

4. The system of claim 2, wherein the electric machine includes an electric motor operably coupled to the turbocharger, the electric motor being configured to supply torque to the turbocharger, thereby increasing the responsiveness of the turbocharger to changes in the signal indicative of a load on the transmission.

5. The system of claim 2, wherein the electric machine includes a generator operably coupled to the turbocharger, the generator being configured to convert mechanical energy of the turbocharger into electric energy, thereby reducing the speed of the turbocharger in response to a desired decrease in intake pressure.

6. The system of claim 2, wherein the turbocharger controller is configured to determine a desired intake pressure based on a signal indicative of a desired output and the signal indicative of a load on the power generation system.

7. The system of claim 6, wherein the turbocharger controller includes a comparator configured to output an intake pressure error based on a difference between the desired intake pressure and the signal indicative of a pressure in the intake system.

8. The system of claim 7, wherein the turbocharger controller includes a controller configured to receive the intake pressure error and output a torque command to the electric machine such that the electric machine acts on the turbocharger to reduce the intake pressure error.

9. A power generation system comprising:
a combustion engine configured to produce mechanical energy, the combustion engine including an intake system;
a generator operably coupled to the combustion engine, the generator being configured to convert at least a portion of the mechanical energy into electric energy;
a turbocharger operably coupled to the intake system of the combustion engine, the turbocharger being configured to increase intake pressure in the intake system;
an electric machine operably coupled to the turbocharger, the electric machine being configured to supply torque to the turbocharger; and
a turbocharger controller operably coupled to the turbocharger and the electric machine, the turbocharger controller being configured to selectively activate the electric machine to supply torque to the turbocharger based on a difference between an actual intake pressure and a desired intake pressure, the desired intake pressure being based at least partially on a load placed on the power generation system.

10. The system of claim 9, wherein the turbocharger controller is configured to receive a signal indicative of a desired output and to control operation of the electric machine such that the turbocharger supplies the desired intake pressure for the combustion engine based partially on the signal indicative of a desired output.

11. The system of claim 9, wherein the electric machine includes an electric motor operably coupled to the turbocharger, the electric motor of the electric machine being configured to supply torque to the turbocharger, thereby increasing the intake pressure.

12. The system of claim 9, wherein the electric machine includes a generator operably coupled to the turbocharger, the generator being configured to convert mechanical energy of the turbocharger into electric energy and to supply a braking torque to the turbocharger, thereby reducing speed of the turbocharger in response to a desired decrease in intake pressure.

13. The system of claim 9, wherein the turbocharger controller is configured to determine a desired intake pressure based on a signal indicative of a desired output and a signal indicative of a load on the power generation system.

14. The system of claim 13 wherein the turbocharger controller includes a comparator configured to output an intake pressure error based on a difference between the actual intake pressure and the desired intake pressure.

15. The system of claim 14, wherein the turbocharger controller includes a controller configured to receive the intake pressure error and output a torque command to the electric machine such that electric machine acts on the turbocharger to reduce the intake pressure error.

16. The system of claim 9, further including a fluid pump operably coupled to the combustion engine, and a fluid-driven motor operably coupled to the fluid pump, the fluid-driven motor being configured to supply torque to at least one driving member.

17. The system of claim 16, further including a sensor operably coupled to at least one of the fluid pump and the fluid-driven motor, the sensor being configured to output a signal indicative of a load on the fluid-driven motor.

18. The system of claim 17, wherein the turbocharger controller is configured to selectively activate the electric machine to supply torque to the turbocharger based on a difference between the actual intake pressure and the desired intake pressure, the desired intake pressure being based at least partially on the signal indicative of a load on the fluid-driven motor.

* * * * *